(12) United States Patent
Brinkley et al.

(10) Patent No.: US 11,377,144 B2
(45) Date of Patent: Jul. 5, 2022

(54) QUICK RESPONSE STEERING SYSTEM

(71) Applicant: CNH Industrial America LLC, New Holland, PA (US)

(72) Inventors: Jerry L. Brinkley, Woodbridge, IL (US); Joshua Guarino, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 299 days.

(21) Appl. No.: 16/440,364

(22) Filed: Jun. 13, 2019

(65) Prior Publication Data

US 2020/0391794 A1  Dec. 17, 2020

(51) Int. Cl.
| | | |
|---|---|---|
| *B62D 5/065* | (2006.01) | |
| *B62D 5/083* | (2006.01) | |
| *B62D 6/00* | (2006.01) | |
| *B62D 5/06* | (2006.01) | |

(52) U.S. Cl.
CPC ............. *B62D 5/065* (2013.01); *B62D 5/062* (2013.01); *B62D 5/083* (2013.01); *B62D 6/00* (2013.01)

(58) Field of Classification Search
CPC ........ B62D 5/065; B62D 5/062; B62D 5/083; B62D 6/00
USPC ........................................................ 180/422
See application file for complete search history.

(56) References Cited

U.S. PATENT DOCUMENTS

| | | | |
|---|---|---|---|
| 4,002,220 A | 1/1977 | Wible | |
| 4,834,205 A | 5/1989 | Mizuno et al. | |
| 4,898,078 A | 2/1990 | Gage et al. | |
| 5,593,002 A | 1/1997 | Okada et al. | |
| 5,927,072 A | 7/1999 | Vannette | |
| 5,967,253 A | 10/1999 | Collier-Hallman | |
| 6,539,710 B2 | 4/2003 | Draper | |
| 7,200,993 B2 * | 4/2007 | Khalil ...................... | B62D 5/09 60/403 |
| 7,849,956 B2 | 12/2010 | Khalil et al. | |
| 7,891,458 B2 * | 2/2011 | Nakamura .............. | E02F 9/225 180/422 |
| 8,651,225 B2 * | 2/2014 | Cadman ................... | B62D 5/09 180/441 |
| 8,925,672 B2 | 1/2015 | Bebemes et al. | |

(Continued)

FOREIGN PATENT DOCUMENTS

WO 2015134706 A1 9/2015

*Primary Examiner* — Minnah L Seoh
*Assistant Examiner* — Felicia L. Brittman
(74) *Attorney, Agent, or Firm* — Rickard K. DeMille; Rebecca L. Henkel (57) ABSTRACT

A quick response steering system with a steering device that steers a vehicle. An electro-hydraulic steering circuit couples to the steering device. The electro-hydraulic steering circuit includes a load sensing pump that pumps hydraulic fluid to a steering cylinder. The load sensing pump increases or decreases output from the load sensing pump in response to a pressure differential between a first fluid line and a second fluid line. A precharge valve diverts hydraulic fluid from the first fluid line to the second fluid line. A controller couples to the steering device and the precharge valve. The controller opens the precharge valve in response to input from the steering device to change a first pressure of the first fluid line to increase an output of the load sensing pump.

13 Claims, 4 Drawing Sheets

(56) References Cited

U.S. PATENT DOCUMENTS 9,200,645 B2 12/2015 Krahn
2015/0021116 A1 1/2015 Young et al.

\* cited by examiner

QUICK RESPONSE STEERING SYSTEM

BACKGROUND

The present disclosure relates generally to a high response electro-hydraulic circuit for a work vehicle.

Certain work vehicles (e.g., tractors, harvesters, etc.) include a cab configured to house an operator and a chassis configured to support the cab. The chassis is also configured to support wheels and/or tracks to facilitate movement of the work vehicle. In addition, various mechanical components of the work vehicle, such as a motor, a transmission, a steering system, and a hydraulic system, among other components, may be supported by the chassis. Furthermore, various mechanical components of the work vehicle may be powered by the hydraulic system. For example, the hydraulic system provides fluid flow to the steering system to enable steering of the work vehicle. However, when the steering system is inactive providing constant flow to the steering system leads to high levels of parasitic loss, which is inefficient. In contrast, maintaining a zero flow level in the steering circuit during inactivity, while reducing parasitic loss, would require a longer period to increase fluid pressure in the steering circuit in response to an active steering state. Increased time to build fluid pressure may cause the steering system to lag while steering. Unfortunately, current steering systems provide either a high response rate with high parasitic loss or a low response rate with low parasitic loss.

BRIEF DESCRIPTION

In one embodiment, a quick response steering system with a steering device that steers a vehicle. An electro-hydraulic steering circuit couples to the steering device. The electro-hydraulic steering circuit includes a load sensing pump that pumps hydraulic fluid to a steering cylinder. The load sensing system increases or decreases output from the load sensing pump in response to a pressure differential between a first fluid line and a second fluid line. A precharge valve diverts hydraulic fluid from the first fluid line to the second fluid line. A controller couples to the steering device and the precharge valve. The controller opens the precharge valve in response to input from the steering device to change a first pressure of the first fluid line to increase an output of the load sensing pump.

In another embodiment, a quick response steering system with a steering control valve that controls a flow of hydraulic fluid to a steering cylinder. A steering device that steers a vehicle. The steering device mechanically couples to the steering control valve. An electro-hydraulic steering circuit couples to the steering device. The electro-hydraulic steering circuit includes a load sensing pump that pumps hydraulic fluid to the steering cylinder. The load sensing pump increases or decreases output from the load sensing pump in response to a pressure differential between a first fluid line and a second fluid line. A precharge valve diverts hydraulic fluid from the first fluid line to the second fluid line. A controller couples to the steering device and the precharge valve. The controller opens the precharge valve in response to input from the steering device to change a first pressure of the first fluid line to increase an output of the load sensing pump.

In still another embodiment, a quick response steering system with a steering control valve that controls a flow of hydraulic fluid to a steering cylinder. The system includes a steering device that steers a vehicle. A sensor couples to the steering device. The sensor detects movement of the steering device and emits a signal indicative of the movement. An electro-hydraulic steering circuit couples to the steering device and includes a load sensing pump that pumps hydraulic fluid to the steering cylinder. The load sensing pump increases or decreases output from the load sensing pump in response to a pressure differential between a first fluid line and a second fluid line. A precharge valve diverts hydraulic fluid from the first fluid line to the second fluid line. A controller couples to the steering device and the precharge valve. The controller opens the precharge valve in response to the signal from the sensor to change a first pressure of the first fluid line to increase an output of the load sensing pump.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
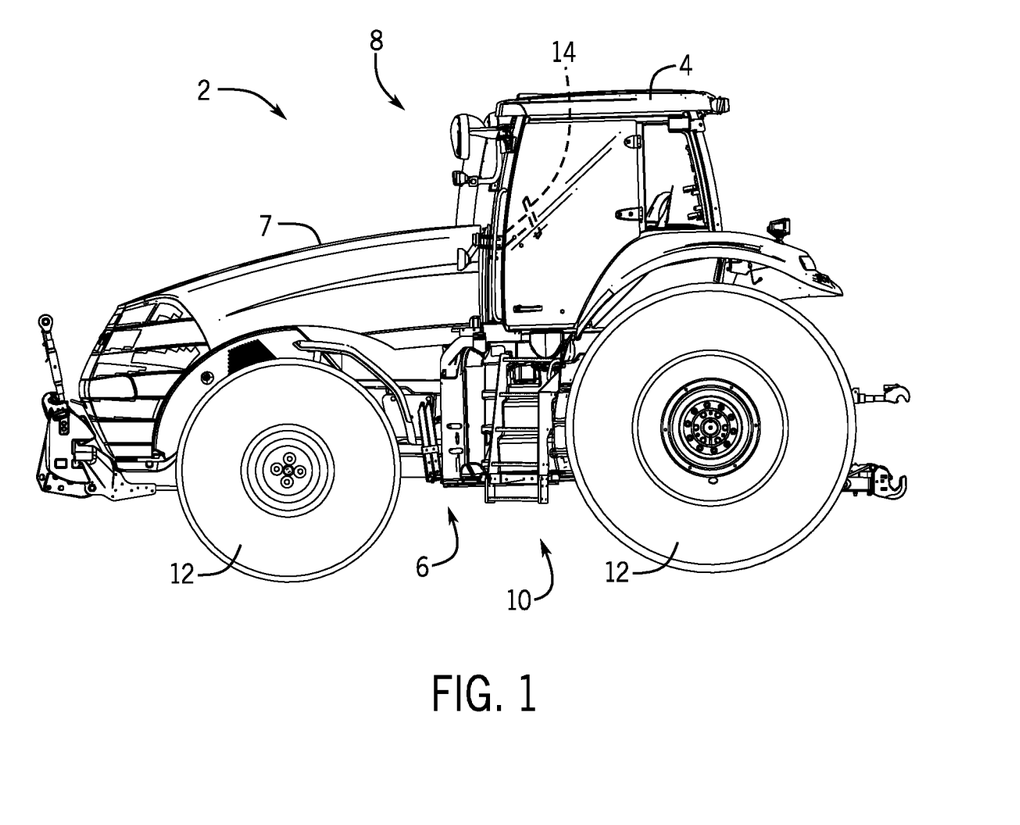
FIG. 1 is a side view of an embodiment of a work vehicle that may include a quick response steering system.

FIG. 1 is a side view of an embodiment of a work vehicle 2. In the illustrated embodiment, the work vehicle 2 is a tractor that includes a cab 4 and a chassis 6. In certain embodiments, the chassis 6 is configured to support a motor 7 (e.g., diesel engine, etc.), a quick response steering system 8, a hydraulic system 10 (e.g., including a pump, valves, a reservoir, etc.), and other components (e.g., an electrical system, a cooling system, etc.) that enable operation of the work vehicle 2. In addition, the chassis 6 is configured to support the cab 4 and wheels 12.

Inside the cab 4 are various controls, such as the steering device 14, that enable an operator to control the work vehicle 2. For example, the steering device 14 (e.g., a steering wheel) communicates with the quick response steering system 8 enabling the operator to turn the wheels 12 through a range of steering angles while operating the work vehicle 2. It should be understood that the high response electro-hydraulic steering system disclosed may be utilized on other work vehicles 2, such as on-road trucks, tractors, harvesters, and construction equipment, among others.

Figure 2:
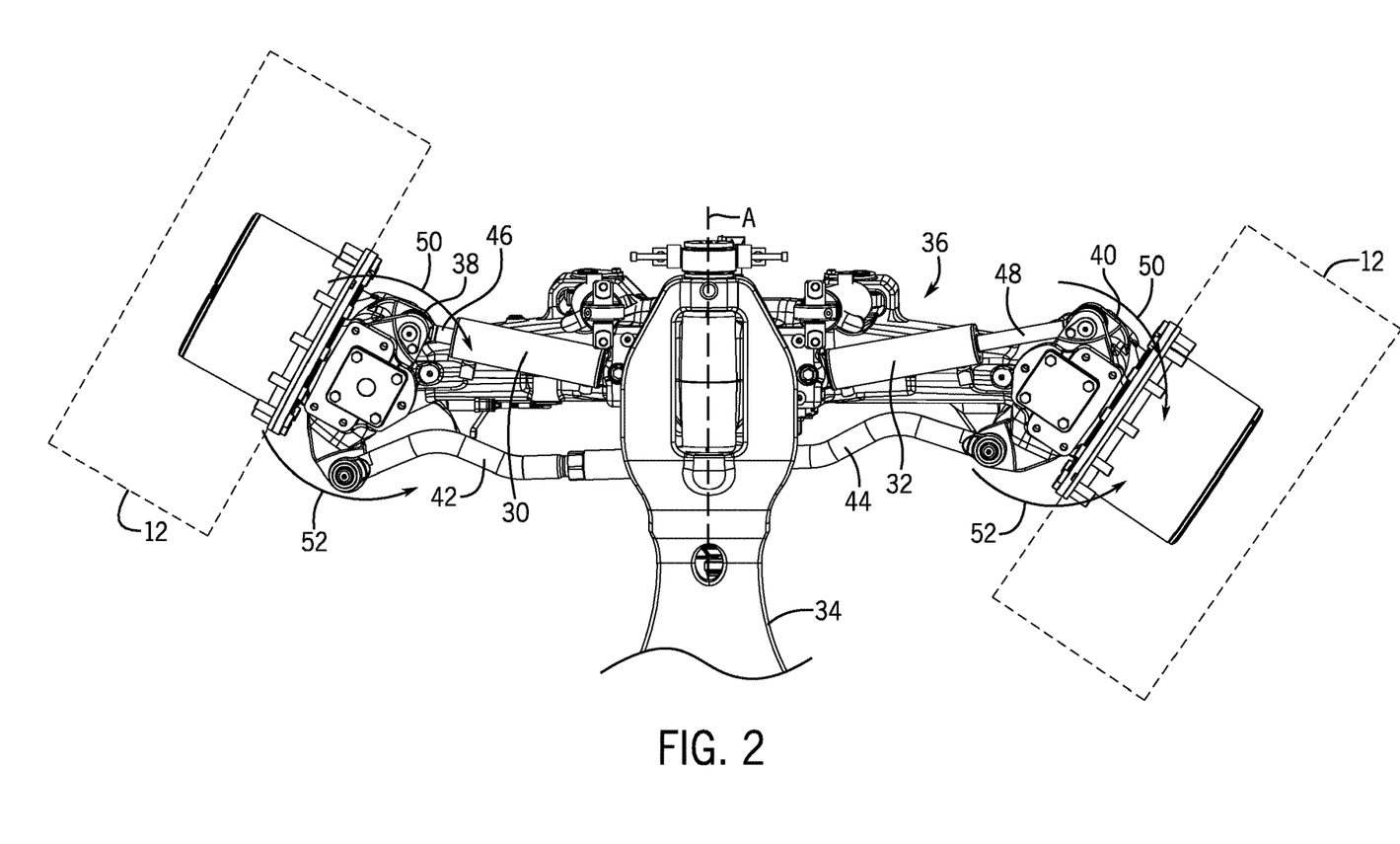
FIG. 2 is a top view of an embodiment of a steering assembly.

FIG. 2 is a top view of a steering assembly 28 of the quick response steering system 8. The steering assembly 28 includes left and right steering cylinders 30, 32 that expand and contract to change the orientation of the wheels 12. Each steering cylinder 30, 32, extends from a frame 34 along the axle 36 to respective knuckles 38, 40. The steering assembly 28 may also include tie rods 42 and 44 that extend from the frame 34 to the knuckles 38, 40 to facilitate synchronized rotation of the wheels 12 relative to the axle 36. In the illustrated embodiment, a piston rod 46 of the left cylinder 30 is in a retracted position and a piston rod 48 of the right cylinder 32 is in an extended position, which rotates the wheels 12 in clockwise direction 50. Conversely, retraction of the piston rod 48 of the right cylinder 32 and extension of the piston rod 46 of the left cylinder 30 will rotate the wheels 12 in counter-clockwise direction 52. The cylinders 30 and 32 may be single or double acting cylinders.

As will be discussed below, the quick response steering system 8 includes an electro-hydraulic circuit that controls hydraulic fluid flow to the left and right steering cylinders 30 and 32 to enable rapid actuation of the left and right steering cylinders 30, 32, while also reducing parasitic loss caused by continuously supplying unnecessary hydraulic flow to the steering assembly 8.

Figure 3:
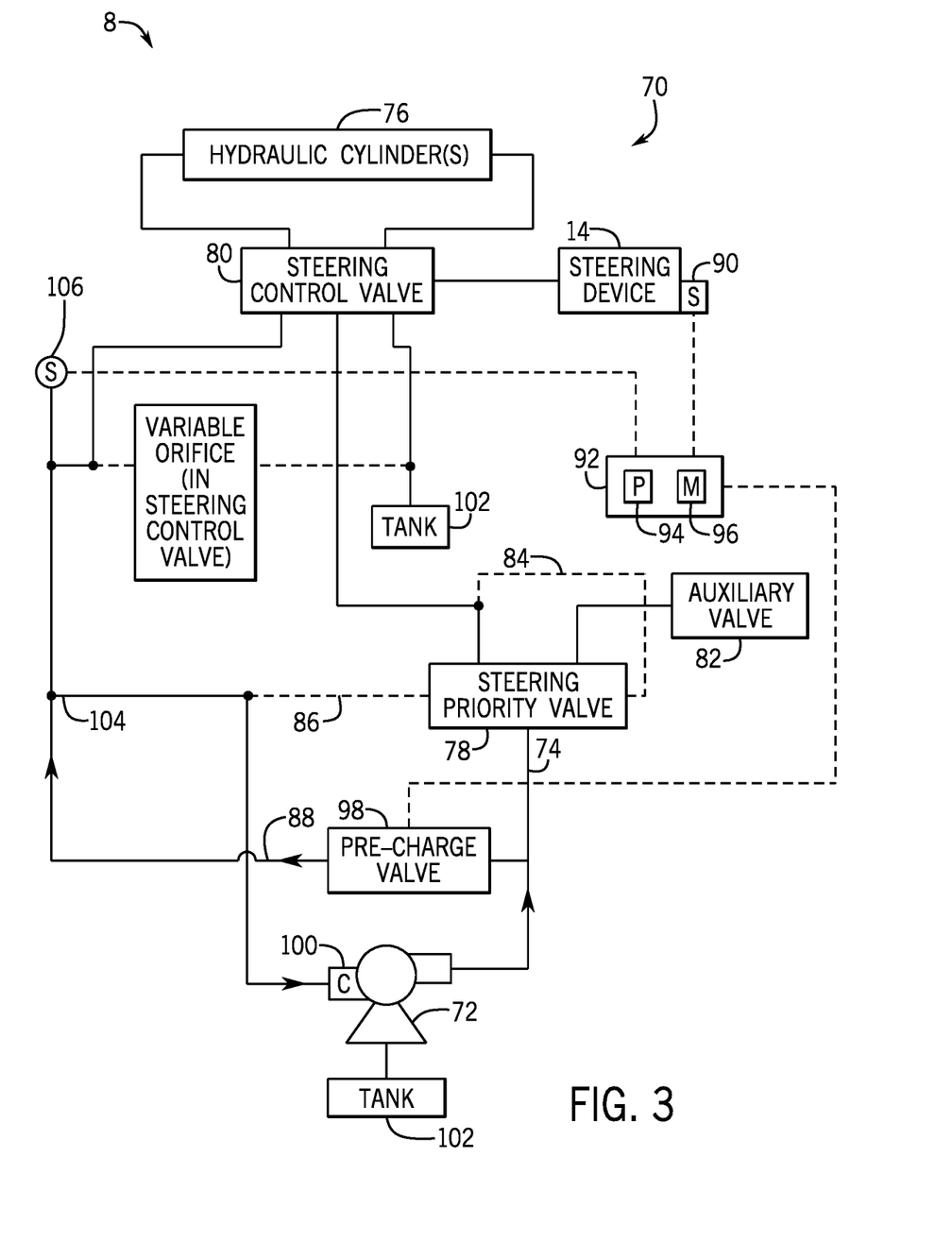
FIG. 3 is a schematic of an embodiment of a quick response steering system.

FIG. 3 is a schematic of an embodiment of the electro-hydraulic circuit 70 of the quick response steering system 8. The electro-hydraulic circuit 70 begins with a load sensing pump 72 that pumps hydraulic fluid through a first fluid line 74 to one or more hydraulic cylinders 76 (e.g., steering hydraulic cylinders 30, 32) of the steering assembly 28. For example, the quick response steering system 8 may include a double acting hydraulic cylinder that controls movement of both left and right wheels 12 or multiple single acting hydraulic cylinders 76 for independently controlling the left and right wheels 12. Regardless of the type of hydraulic cylinder(s) 76 used, the hydraulic cylinder(s) 76 use the hydraulic pressure supplied by the load sensing pump 72 to generate force for rotating the wheels 12 of the work vehicle 2.

In between the hydraulic cylinder(s) 76 and the load sensing pump 72 are multiple valves. These valves include a steering priority valve 78 and a steering control valve 80. As the hydraulic fluid flows through the first fluid line 74, the fluid first encounters the steering priority valve 78. In operation, the steering priority valve 78 directs the hydraulic fluid to the hydraulic cylinder 76 or to auxiliary hydraulic equipment on the work vehicle 2 through an auxiliary valve 82. As explained above, the quick response steering system 8 reduces parasitic losses associated with supplying pressurized hydraulic fluid to the hydraulic cylinder(s) 76 when pressurized hydraulic fluid is not needed. For example, when a driver is not turning the work vehicle 2. Accordingly, the pressurized hydraulic fluid may be diverted to other systems on the work vehicle 2 when pressurized hydraulic fluid is not needed by the hydraulic cylinders 76, thus reducing parasitic losses.

The steering priority valve 78 is controlled by first and second sensing lines 84 and 86. As illustrated, the first sensing line 84 fluidly couples to the first fluid line 74 and the second sensing line 86 fluidly couples to a second fluid line 88. The first and second sensing lines 84 and 86 transfer hydraulic pressure from the respective first and second fluid lines 74 and 88 to the steering priority valve 78. Depending on the pressure of the hydraulic fluid in the first and second fluid lines 74 and 88 the steering priority valve 78 alternates between directing hydraulic fluid to the steering control valve 80 or to the auxiliary valve 82. In other words, the pressure differential between the first and second sensing lines 84, 86 drives operation of the steering priority valve 78. More specifically, if the hydraulic pressure in the first sensing line 84 is greater than the pressure in the second sensing line 86 by a threshold amount (e.g., 10 bar, 15 bar, 20 bar, 25 bar, 30 bar) then the steering priority valve 78 diverts hydraulic fluid away from the cylinder(s) 76 to the auxiliary valve 82. In contrast, if the hydraulic pressure differential between first sensing line 84 and second sensing line 86 is less than a spring constant of a spring that controls the opening and closing of the steering priority valve then the steering priority valve 78 directs hydraulic fluid to the cylinder(s) 76 and away from the auxiliary valve 82.

After passing through the steering priority valve 78, the hydraulic fluid flows to the steering control valve 80. The steering control valve 80 opens and closes in response to movement of the steering device 14 to control the flow of hydraulic fluid to the cylinder(s) 76. As illustrated, the steering device 14 is mechanically coupled to the steering control valve 80. Accordingly, as a user manipulates the steering device 14, the input from the user is transmitted from the steering device 14 to the steering control valve 80. For example, the steering device 14 may be a steering wheel and the steering control valve 80 may be a rotary spool valve. As the user turns the steering wheel, the rotational motion of the steering wheel is transferred to the rotary spool valve. Rotation of the rotary spool valve opens and closes the valve enabling hydraulic fluid to flow to the hydraulic cylinder(s) 76, which then rotate the wheels 12 in the desired direction. Likewise, hydraulic fluid flows from steering priority valve 78 through the second sensing line 86, to tank 102 via the steering control valve 80. This flow is throttled away from tank 102 in response to the movement of the steering device 14.

In order to reduce parasitic losses associated with supplying pressurized hydraulic fluid to the cylinder(s) 76 when not in use, the quick response steering system 8 includes a sensor 90 that detects movement of the steering device 14. For example, the sensor 90 may be an angular sensor that detects rotation of a steering wheel. The sensor 90 transmits a signal indicative of movement of the steering device 14 to a controller 92. The controller 92 receives and processes this signal using a processor 94 that executes instructions stored on a memory 96. In response to the signal from the sensor 90, the controller 92 controls operation of a precharge valve 98. By opening and closing the precharge valve 98, the controller 92 is able to divert hydraulic fluid from the first fluid line 74 into the second fluid line 88. The diversion of fluid from the first fluid line 74 to the second fluid line 88 changes the pressure between the two lines, or in other words a pressure differential. The change in pressure is detected by the pump controller 100, which then drives operation of the load sensing pump 72. More specifically, the pump controller 100 detects the pressure of the hydraulic fluid in the first and second fluid lines 74 and 88 and drives operation of the load sensing pump 72 to maintain a threshold pressure differential between the first fluid line 74 and the second fluid line 88, with the pressure in the first fluid line 74 being greater than the pressure in the second fluid line 88.

More specifically, as the controller 92 detects movement of the steering device 14, with sensor 90, the controller 92 opens the precharge valve 98. As the precharge valve 98 opens, fluid is diverted from the first fluid line 74 and into the second fluid line 88. Hydraulic fluid then travels along the second fluid line 88 to the tank 102. However, because the second fluid line 88 is restrictive or in other words unable to carry significant amounts of hydraulic fluid, pressure builds rapidly in the second fluid line 88. As illustrated, the second fluid line 88 includes a node/sensing line 104, which communicates the pressure in the second line to the pump controller 100. The pump controller 100 detects the increase in pressure in the second fluid line 88 and the corresponding change in pressure differential between the first fluid line 74 and the second fluid line 88. As the pressure differential exceeds a threshold value (e.g., 10 bar, 15 bar, 20 bar, 25 bar, 30 bar), the pump controller 100 activates the load sensing pump 72 to start pumping more hydraulic fluid into the first fluid line 74. This raises the pressure of the hydraulic fluid in the first fluid line 74. The load sensing pump 72 continues to operate (i.e., increase pumping of the hydraulic fluid) until the appropriate threshold pressure difference between the first and second fluid lines 74, 88 is reached. In this way, the quick response steering system 8 pre-pressurizes the first fluid line 74, the second fluid line 88, and the node/sensing line 104 before opening the steering control valve 80 to power the hydraulic cylinder(s) 76.

In order to determine when to close the precharge valve 98, the controller 92 couples to a pressure sensor 106 on the second fluid line 88. In operation, the pressure sensor 106 produces a signal indicative of the pressure in the second fluid line 88. The controller 92 receives the signal from the pressure sensor 106 and is programmed so that once the second fluid line 88 reaches a threshold pressure the controller 92 recognizes that the load sensing pump 72 has increased its pumping capacity to a threshold level capable of driving operation of the cylinder(s) 76 and/or that the pressure in the first fluid line 74 is sufficient to drive operation of the hydraulic cylinder(s) 76. Accordingly, once this threshold pressure is reached in the second fluid line 88, the controller 92 closes the precharge valve 98.

In order to precharge the first fluid line 74, the steering device 14 may include a dead band zone that enables the controller 92 to detect actuation of steering device 14 and open the precharge valve 98 to activate the load sensing pump 72, all before the driver expects actuation of the cylinder(s) 76 (i.e., rotation of the wheels 12). For example, a rotatable steering device 14 may be configured to have a dead band zone between negative eight degrees rotation (e.g., turning the steering wheel left eight degrees) and positive eight degrees rotation (e.g., turning the steering wheel right eight degrees) of the steering input device with respect to a neutral position (e.g., positioning the steering wheel such that the vehicle drives straight). In this way, the quick response steering system 8 may provide the driver with responsive and/or smooth steering power without sacrificing efficiency by incurring parasitic losses while the system is deactivated.

Figure 4:
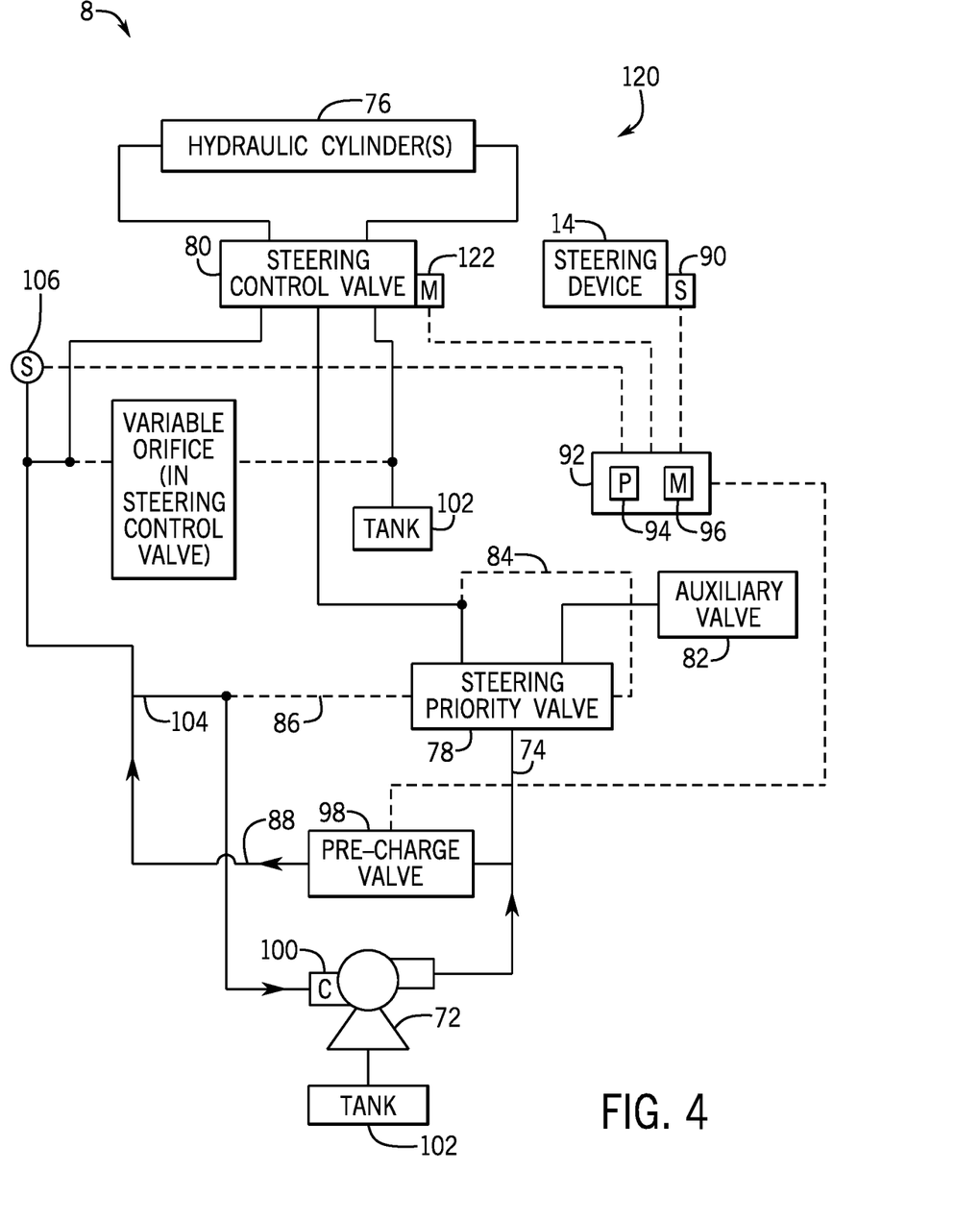
FIG. 4 is a schematic of an embodiment of a quick response steering system.

FIG. 4 is a schematic of an embodiment of the electro-hydraulic circuit 120 of the quick response steering system 8. The electro-hydraulic circuit 120 begins with a load sensing pump 72 that pumps hydraulic fluid through a first fluid line 74 to one or more hydraulic cylinders 76 (e.g., hydraulic cylinders 30, 32) of the steering assembly 28. The hydraulic cylinder(s) 76 use the hydraulic pressure supplied by the load sensing pump 72 to generate force for rotating the wheels 12 of the work vehicle 2.

The flow of hydraulic fluid from the load sensing pump 72 to the cylinder(s) 76 is controlled by multiple valves. These valves include a steering priority valve 78 and a steering control valve 80. In operation, the steering priority valve 78 controls the flow of hydraulic fluid to the hydraulic cylinder(s) 76 or to the auxiliary valve 82. As explained above, the quick response steering system 8 reduces parasitic losses by optimizing the flow of pressurized load sense hydraulic fluid to the tank 102. For example, if the quick response steering system 8 is not in use, supplying pressurized hydraulic fluid flow to it may unnecessarily increases energy consumption. The steering priority valve 78 therefore does not direct hydraulic fluid to the tank 102 in order to keep the hydraulic pump 72 charged, but instead utilizes the pre-charge valve 98, which is only activated when needed.

After passing through the steering priority valve 78, the hydraulic fluid flows to the steering control valve 80. The steering control valve 80 opens and closes in response to movement of the steering device 14 to control the flow of hydraulic fluid to the cylinder(s) 76.

However, instead of mechanically coupling the steering device 14 to the steering control valve 80, the steering control valve 80 is controlled using a motor 122 that couples to the controller 92. As explained above, the sensor 90 couples to the steering device 14. Movement of the steering device 14 by the driver is then sensed by the sensor 90 and a signal indicative of the movement is sent to the controller 92. For example, the sensor 90 may be an angular sensor that detects rotation of a steering wheel. The controller 92 receives and processes this signal using the processor 94, which executes instructions stored on the memory 96 to control operation of the motor 122. The motor 122 controls the opening and closing of the steering control valve 80.

In order to reduce parasitic losses associated with supplying pressurized hydraulic fluid to the tank 102 when not in use, the quick response steering system 8 controls operation of a precharge valve 98. By opening and closing the precharge valve 98, the quick response steering system 8 is able to divert hydraulic fluid from the first fluid line 74 into the second fluid line 88. The diversion of fluid from the first fluid line 74 to the second fluid line 88 changes the pressure between the two lines. The change in pressure is detected by the pump controller 100, which then drives operation of the load sensing pump 72. More specifically, the pump controller 100 detects the pressure of the hydraulic fluid in the first and second fluid lines 74 and 88 and drives operation of the load sensing pump 72 to maintain a threshold pressure differential between the first fluid line 74 and the second fluid line 88, with the pressure in the first fluid line 74 being greater than the pressure in the second fluid line 88.

More specifically, as the controller 92 detects movement of the steering device 14, with sensor 90, the controller 92 opens the precharge valve 98. As the precharge valve 98 opens, fluid is diverted from the first fluid line 74 to the second fluid line 88. Hydraulic fluid then travels along the second fluid line 88 to the tank 102 through a variable orifice in the steering control valve 80. However, because the variable orifice in the steering control valve 80 is restrictive or in other words unable to carry significant amounts of hydraulic fluid, pressure builds rapidly in the second fluid line 88. The variable orifice in the steering control valve 80 becomes increasingly more restrictive as the steering control valve 80 is opened further, to the point where the variable orifice closes. As illustrated, the second fluid line 88 includes a node/sensing line 104, which communicates the pressure in the second line to the pump controller 100. The pump controller 100 detects the increase in pressure in the second fluid line 88 and the corresponding change in pressure between the first fluid line 74 and the second fluid line 88. As the pressure differential exceeds a threshold amount, the pump controller 100 activates the load sensing pump 72 to start pumping more hydraulic fluid into the first fluid line 74. This raises the pressure of the hydraulic fluid in the first fluid line 74. The load sensing pump 72 continues to operate and/or increase pumping of the hydraulic fluid until reaching the appropriate threshold difference between the first and second fluid lines 74, 88. In this way, the quick response steering system 8 pre-pressurizes the first and second fluid lines 74, 88 before opening the steering control valve 80.

In order to determine when to close the precharge valve 98, the controller 92 couples to a pressure sensor 106 on the second fluid line 88. In operation, the pressure sensor 106 produces a signal indicative of the pressure in the second fluid line 88. The controller 92 receives the signal from the pressure sensor 106 and is programmed to determine that once the second fluid line 88 reaches a threshold pressure the load sensing pump 72 has increased its pumping capacity to a threshold level capable of driving operation of the cylinder(s) 76 and/or that the pressure in the first fluid line 74 is sufficient to drive operation of the hydraulic cylinder(s) 76. Once this threshold pressure is reached in the second fluid line 88, the controller 92 closes the precharge valve 98. The closure of pre-charge valve 98 is timed to occur just as the steering control valve 80 is opened by the movement of the operator through the steering device 14. This timing is to ensure that the hydraulic fluid pressure in the first and second fluid lines 74, 88 do not have time to significantly decay down through the variable orifice in the steering control valve 80.

In some embodiments, the steering device 14 may include a dead band zone that enables the controller 92 to detect actuation of steering device 14 and in response open the precharge valve 98 to activate the load sensing pump 72 before the driver expects actuation of the cylinder(s) 76 (i.e., rotation of the wheels 12). For example, a rotatable steering device 14 may be configured to have a dead band zone between negative eight degrees rotation (e.g., turning the steering wheel left eight degrees) and positive eight degrees rotation (e.g., turning the steering wheel right eight degrees) of the steering input device with respect to a neutral position (e.g., positioning the steering wheel such that the vehicle drives straight). In this way, the quick response steering system 8 may provide the driver with responsive and/or smooth steering power while simultaneously blocking constant high pressure hydraulic fluid flow to the tank 102, thus reducing parasitic loss.

While the embodiments disclosed herein may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A quick response steering system, comprising:
 a steering device configured to steer a vehicle;
 an electro-hydraulic steering circuit coupled to the steering device, comprising:
  a load sensing pump configured to pump hydraulic fluid to a steering cylinder, wherein the load sensing pump is configured to increase or decrease output in response to a pressure differential between a first fluid line and a second fluid line;
  a precharge valve configured to divert hydraulic fluid from the first fluid line to the second fluid line; and
  a controller coupled to the steering device and the precharge valve, wherein the controller is configured to open and close the precharge valve in response to input from the steering device to change pressure of the first and second fluid lines to increase an output of the load sensing pump;
 a steering priority valve coupled to the first fluid line, wherein the steering priority valve is configured to send the hydraulic fluid to the steering cylinder or to an auxiliary valve; and
 a first load sensing line and a second load sensing line coupled to the steering priority valve, wherein the first load sensing line and the second load sensing line control whether the hydraulic fluid in the first fluid line flows to the steering cylinder or to the auxiliary valve.

2. The system of claim 1, comprising a pressure sensor coupled to the second fluid line and configured to emit a signal indicative of the pressure in the second fluid line.

3. The system of claim 1, wherein the first load sensing line transmits a pressure in the second fluid line to the steering priority valve and the second load sensing line transmits the pressure of the first fluid line to the steering priority valve.

4. The system of claim 1, comprising a steering control valve coupled to the first fluid line, wherein the steering control valve is configured to control hydraulic fluid flow from the first fluid line to the steering cylinder.

5. The system of claim 4, wherein the steering device mechanically couples to the steering control valve, and wherein the steering device opens and closes the steering control valve.

6. The system of claim 5, comprising a sensor coupled to the steering device and configured to detect movement of the steering device and to output a signal indicative of the movement.

7. The system of claim 6, wherein the controller is configured to receive the signal from the sensor and to open the precharge valve in response to the signal.

8. The system of claim 6, wherein the sensor is an angular sensor configured to detect rotation of the steering device.

9. A quick response steering system, comprising:
 a steering control valve configured to control a flow of hydraulic fluid to a steering cylinder;
 a steering device configured to steer a vehicle, wherein the steering device mechanically couples to the steering control valve;
 an electro-hydraulic steering circuit coupled to the steering device, comprising:
  a load sensing pump configured to pump hydraulic fluid to the steering cylinder, wherein the load sensing pump is configured to increase or decrease output from the load sensing pump in response to a pressure differential between a first fluid line and a second fluid line;
  a precharge valve configured to divert hydraulic fluid from the first fluid line to the second fluid line; and
  a controller coupled to the steering device and the precharge valve, wherein the controller is configured to open the precharge valve in response to input from the steering device to change a first pressure of the first fluid line to increase an output of the load sensing pump a steering priority valve coupled to the first fluid line, wherein the steering priority valve is configured to send the hydraulic fluid to the steering cylinder or to an auxiliary valve; and a first load sensing line and a second load sensing line coupled to the steering priority valve, wherein the first load sensing line and the second load sensing line control whether hydraulic fluid in the first fluid line flows to the steering cylinder or to the auxiliary valve.

10. The system of claim 9, comprising a sensor coupled to the steering device and configured to detect movement of the steering device and to output a signal indicative of the movement.

11. The system of claim 10, wherein the controller is configured to receive the signal from the sensor and to open the precharge valve in response to the signal.

12. The system of claim 10, wherein the sensor is an angular sensor configured to detect rotation of the steering device.

13. The system of claim 9, wherein the steering control valve is a rotary spool valve.

* * * * *